(12) United States Patent
Wang (10) Patent No.: US 9,946,507 B2
(45) Date of Patent: Apr. 17, 2018

(54) ELECTRONIC DEVICE AND CONTROL METHOD

(71) Applicant: Lenovo (Beijing) Limited, Beijing (CN)

(72) Inventor: Zhenyu Wang, Beijing (CN)

(73) Assignee: Lenovo (Beijing) Limited, Beijing (CN)

(*) Notice: Subject to any disclaimer, the term of this patent is extended or adjusted under 35 U.S.C. 154(b) by 114 days.

(21) Appl. No.: 15/087,556

(22) Filed: Mar. 31, 2016

(65) Prior Publication Data

US 2017/0109114 A1   Apr. 20, 2017

(30) Foreign Application Priority Data

Oct. 20, 2015  (CN) .......................... 2015 1 0685039

(51) Int. Cl.
| | | |
|---|---|---|
| *G06F 3/14* | (2006.01) | |
| *G06F 3/147* | (2006.01) | |
| *G06F 1/16* | (2006.01) | |
| *G06T 17/00* | (2006.01) | |
| *G01K 13/00* | (2006.01) | |

(52) U.S. Cl.
CPC ............ *G06F 3/147* (2013.01); *G01K 13/00* (2013.01); *G06F 1/1652* (2013.01); *G06F 1/1677* (2013.01); *G06T 17/00* (2013.01); *G09G 2380/02* (2013.01)

(58) Field of Classification Search
CPC .............................. G06F 1/1652; G06F 1/1654
See application file for complete search history.

(56) References Cited

U.S. PATENT DOCUMENTS

| | | | |
|---|---|---|---|
| 2013/0329422 A1* | 12/2013 | Park ................. | G02F 1/133305 362/233 |
| 2014/0098075 A1* | 4/2014 | Kwak .................. | G06F 3/0487 345/204 |
| 2015/0220119 A1* | 8/2015 | Seo ......................... | G06F 3/041 345/173 |
| 2015/0227173 A1* | 8/2015 | Hwang ................. | G06F 1/1652 345/619 |

FOREIGN PATENT DOCUMENTS

| | | |
|---|---|---|
| CN | 103128743 A | 6/2013 |
| CN | 104781778 A | 7/2015 |
| CN | 104834380 A | 8/2015 |

* cited by examiner

*Primary Examiner* — Kevin M Nguyen
(74) *Attorney, Agent, or Firm* — Ference & Associates LLC (57) ABSTRACT

One embodiment provides a method including: detecting a deformation of a first flexible display of a first electronic device; obtaining deformation information relating to said deformation; and transmitting the obtained deformation information to a second electronic device comprising a second flexible display, to control the second flexible display based on the transmitted deformation information. Other aspects are described and claimed.

20 Claims, 5 Drawing Sheets a b

ELECTRONIC DEVICE AND CONTROL METHOD

CLAIM FOR PRIORITY

This application claims priority to Chinese Application No. 201510685039.6, filed on Oct. 20, 2015, which is fully incorporated by reference herein.

FIELD

The subject matter described herein relates to relates to the field of electronic technologies, and more particularly, to an information processing method and electronic equipment.

BACKGROUND

Compared with a traditional display, a flexible display is thinner in size, lower in power consumption, and characterized by deformability and bendability. For example, the flexible display may wrap an object up, and an object may press on the flexible display so that a corresponding part of the flexible display sinks.

BRIEF SUMMARY

In summary, one aspect provides a method, comprising: detecting a deformation of a first flexible display of a first electronic device; obtaining deformation information relating to said deformation; and transmitting the obtained deformation information to a second electronic device comprising a second flexible display, to control the second flexible display based on the transmitted deformation information.

Another aspect provides an electronic device, comprising: a processor; a first flexible display operatively coupled to the processor; a transceiver operative coupled to the processor; and a memory device that stores instructions executable by the processor to: detect a deformation of the first flexible display; obtain deformation information relating to said deformation; and instruct the transceiver to transmit the deformation information to another electronic device having a second flexible display to control the second flexible display based on the transmitted deformation information.

A further aspect provides an electronic device, comprising: a processor; a second flexible display coupled to the processor; a transceiver coupled to the processor, and a memory device that stores instructions executable by the processor to: obtain deformation information received by the transceiver from another electronic device having a first flexible display, said deformation information being a deformation of the first flexible display, and control the second flexible display based upon the received deformation information.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

By means of providing an information processing method and electronic equipment, embodiments solve the technical problem that, in the prior art, a flexible display is unable to record deformation information, and implement the technical effect that the flexible display can record deformation. By means of providing an information processing method and electronic equipment, embodiments implement the technical effect such that the flexible display can record deformation.

A general thought of the technical solutions in the embodiments is as follows: acquiring a first operation performed on a flexible display; responding to the first operation, the flexible display deforming, wherein in the process when the flexible display produces a deformation, at least a part area of the flexible display comes in contact with at least a part surface of a first object; and recording at least one piece of deformation information of the at least part area.

In the foregoing method, such a technical solution is adopted as follows: acquiring a first operation performed on a flexible display; responding to the first operation, and the flexible display deforming accordingly, wherein in the process when the flexible display produces a deformation, at least a part area of the flexible display comes in contact with at least a part surface of a first object; and recording at least one piece of deformation information of the at least part area. Namely, in the application, an operation is performed on the flexible display by means of an object so that when the flexible display produces a deformation, the flexible display can record deformation information sent by the flexible display. Therefore, the application effectively solves the technical problem that, in the prior art, the flexible display is unable to record the deformation information, and thus implements the technical effect that the flexible display can record deformation.

The following clearly and completely describes the technical solutions of the present invention with reference to the accompanying drawings in the embodiments of the present invention. The described embodiments are some but not all of the embodiments of the technical solutions of the present invention. All other embodiments obtained by a person of ordinary skill in the art based on the embodiments of the application document without creative efforts shall fall within the protection scope of the technical solutions of the present invention.

Embodiment I

Figure 1:
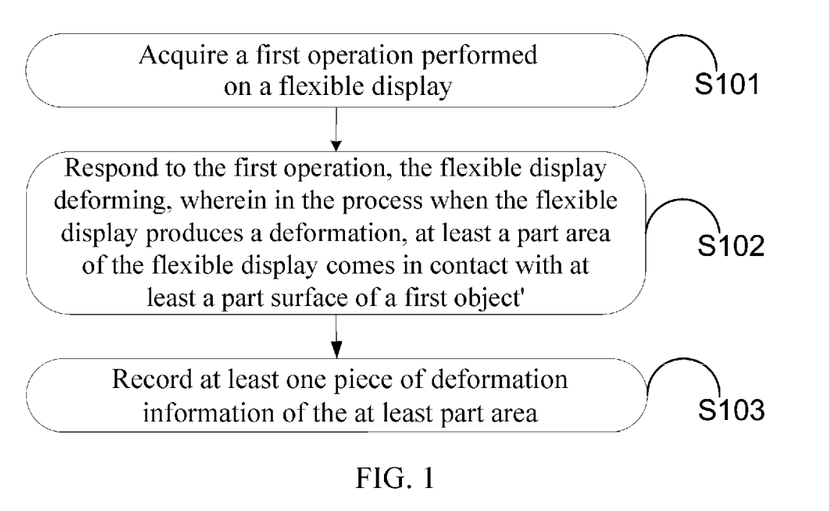
FIG. 1 is a flowchart of an information processing method according to Embodiment I.

Referring to FIG. 1, which shows an information processing method according to Embodiment I of the application, the method includes:

S101: Acquire a first operation performed on a flexible display;

S102: Respond to the first operation, and the flexible display produces a deformation accordingly, wherein in the process when the flexible display produces a deformation, at least a part area of the flexible display comes in contact with at least a part surface of a first object; and S103: Record at least one piece of deformation information of the at least part area.

In a concrete implementation process, the foregoing method may be applied to electronic equipment whose flexible display may be separately used or sold, and also may be applied to other electronic equipment products including the flexible display, for example, a mobile phone or a computer provided with the flexible display. Specifically, in this embodiment, the concrete implementation process of the method in the embodiments is described in detail by taking a flexible display that may be separately used or sold as an example.

When the method in this embodiment is used for information processing, first, Step S101 is executed, namely, acquiring a first operation performed on a flexible display. In practical application, Step S101 at least includes the following two implementations.

The First Implementation:

detecting and acquiring a wrapping operation configured to wrap the first object in the flexible display.

Figure 2:
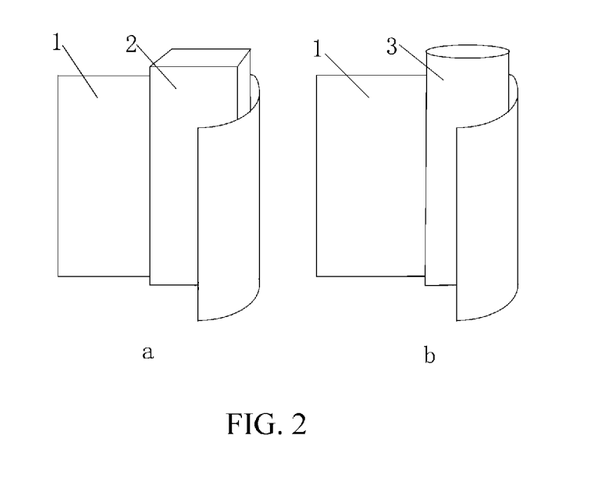
FIG. 2 is a schematic structural diagram illustrating a flexible display wrapping objects according to Embodiment I.

In a concrete implementation process, the flexible display is characterized by deformability and bendability. Therefore, the flexible display may wrap an object up along the surface of the object. Specifically, referring to FIG. 2a, when the flexible display 1 wraps a cuboid 2 up along the surface of the cuboid 2, the flexible display 1 can detect a wrapping operation performed on the flexible display 1, and then the flexible display 1 can acquire the wrapping operation. Referring to FIG. 2b, when the flexible display 1 wraps a cylinder 3 up along the surface of the cylinder 3, the flexible display 1 can also detect the wrapping operation performed on the flexible display 1 along the surface of the cylinder 3, and then the flexible display 1 can also acquire the corresponding wrapping operation.

The Second Implementation:

detecting and acquiring a pressing operation performed by an operation body on the flexible display, where the operation body is the first object.

Figure 3:
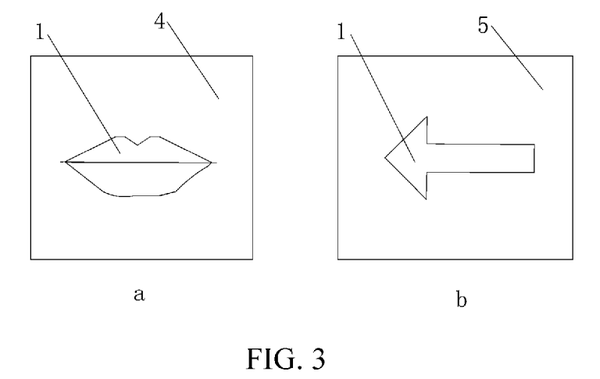
FIG. 3 is a schematic structural diagram illustrating objects pressing on the flexible display according to Embodiment I.

In a concrete implementation process, the flexible display is characterized by deformability and bendability. Therefore, a pressing operation may also be performed on the flexible display by means of an operation body. The operation body may be a human finger, a human lip or other human organs. And the operation body may also be some specific objects such as an arrow-shaped model or a circular model and so on. Specifically, referring to FIG. 3a, when a pressing operation is performed on the flexible display 1 by means of the human lip 4, the flexible display 1 may detect the pressing operation, and then the flexible display 1 can acquire the pressing operation. Referring to FIG. 3b, when a pressing operation is performed on the flexible display 1 by means of the arrow-shaped model 5, the flexible display 1 may also detect the pressing operation, and then the flexible display 1 can acquire the pressing operation.

In practical application, Step S101 may also be implemented by means of other implementations in addition to either of the foregoing two implementations, not to be enumerated herein.

After Step S101 is executed, according to the method of an embodiment, Step S102 is executed, namely, responding to the first operation, and the flexible display deforming accordingly, wherein in the process when the flexible display produces a deformation, at least a part area of the flexible display comes in contact with at least a part surface of a first object.

In a concrete implementation process, use of the foregoing example is continued. Specifically, after it is detected and acquired the wrapping operation in which the flexible display wraps the cuboid up along the external surface of the cuboid, the flexible display may respond to the wrapping operation. An area on the flexible display in contact with the surface of the cuboid is squeezed by the cuboid when the wrapping operation is performed on this area along the surface, and accordingly this part of area on the flexible display produces a deformation. Specifically, after it is detected and acquired the pressing operation performed by the human lip on the flexible display, the flexible display may respond to the pressing operation, an area on the flexible display in contact with the lip is pressed by the lip, and accordingly this part of area on the flexible display produces a deformation.

Figure 4:
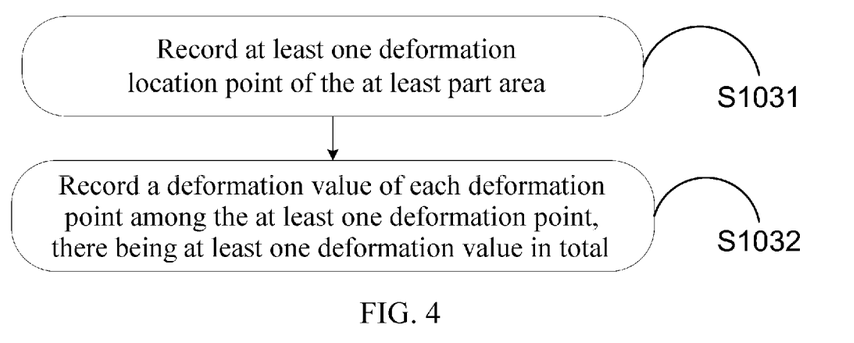
FIG. 4 is a flowchart of a specific implementation of Step S103 according to Embodiment.

After Step S102 is executed, according to a method of an embodiment, Step S103 is executed, namely, recording at least one piece of deformation information of the at least part area. In an embodiment, refer to FIG. 4, which shows a specific implementation of Step S103:

S1031: Record at least one deformation location point of the at least part area; and S1032: Record at least one deformation value of the at least one deformation location point.

In a concrete implementation process, use of the foregoing example is continued. In practical application, the flexible display may be divided into multiple points according to pixel, and the multiple points constitute the surface of the flexible display. For example, the flexible display is divided into 10×10 pixel points according to pixel. Of course, the person skilled in the art also may divide the flexible display in other ways according to the actual need. In this embodiment, specifically, an example is taken in which the flexible display is divided into 10×10 pixel points according to pixel, when the area on the flexible display in contact with the surface of the cuboid specifically is an area enclosed by a first pixel point to a 56th pixel point, after the area enclosed by the first pixel point to the 56th pixel point (56 pixel points in total) produces a deformation, the flexible display may record coordinate positions of the 56 pixel points before the deformation so that the flexible display can learn which points of the flexible display deform. Also, the flexible display may record the deformation value of the coordinate position of each one of the 56 pixel points after the deformation. In practical application, the deformation value may be a new position coordinate value of each one of the 56 pixel points after the deformation, or the deformation value may be a variation, compared with the coordinate position before the deformation, of the coordinate position of each one of the 56 pixel points after the deformation, so that the flexible display may record which points of the flexible display deform and record corresponding deformation values. In a concrete implementation process, use of the foregoing example is continued. Specifically, when the area on the flexible display in contact with the lip has 40 pixel points, after the surface made up of the 40 pixel points is pressed by the lip and thus produces a deformation, the flexible display may record coordinate positions of the 40 pixel points before the deformation so that the flexible display can learn which points of the flexible display deform. Also, the flexible display may record the deformation value of the coordinate position of each one of the 40 pixel points after the deformation. In practical application, the deformation value may be a new position coordinate value of each one of the 40 pixel points after the deformation, or the deformation value may be a variation, compared with the coordinate position before the deformation, of the coordinate position of each one of the 40 pixel points after the deformation, so that the flexible display may record which points of the flexible display deform and record corresponding deformation values. Therefore, the application effectively solves the technical problem that, in the prior art, the flexible display is unable to record deformation information, and thus implements the technical effect that the flexible display can record deformation.

In a specific implementation process, after Step S103 is executed, the method may further include: based on the at least one deformation location point, determining plane shape information of the at least part surface of the first object; and based on the at least one deformation value and the plane shape information, determining three-dimensional profile information of at least a part of the first object corresponding to the at least part surface.

In a concrete implementation process, use of the foregoing example is continued. Specifically, after the flexible display records the coordinate position of each one of the 56 pixel points in contact with the surface of the cuboid before the deformation and the new position coordinate value of each one of the 56 pixel points after the deformation, the flexible display may obtain, according to the recorded coordinate position of each one of the 56 pixel points in contact with the surface of the cuboid before the deformation, plane information of the surface of the cuboid, namely, the plane made up of the coordinate positions of the 56 pixel points before the deformation is the plane shape of the unfolded surface of the cuboid. The flexible display also records the new position coordinate value of each one of the 56 pixel points after the deformation, so that the flexible display is capable of three-dimensional modeling according to the new coordinate positions of the 56 pixel points after the deformation and the plane shape of the unfolded surface of the cuboid to form three-dimensional profile information corresponding to the surface of the cuboid. Therefore, the flexible display can learn or let other electronic equipment in communication connection with the flexible display learn the profile information of the surface of the cuboid. Therefore, the application effectively solves the technical problem that the electronic equipment including the flexible display is unable to acquire the profile information of the object, and thus implements the technical effect that the flexible display can acquire and transfer the profile information of the object.

Specifically, after the flexible display records the coordinate position of each one of the 40 pixel points of the area corresponding to the lip before the deformation and the new position coordinates of the 40 pixel points after they are pressed by the lip and thus deform, the flexible display may obtain, according to the recorded coordinate position of each one of the 40 pixel points in contact with the lip before the deformation, plane information of the lip, namely, the plane made up of the coordinate positions of the 40 pixel points before the deformation is the plane shape of the lip. The flexible display also records the new position coordinate value of each one of the 40 pixel points after the deformation, so that the flexible display is capable of three-dimensional modeling according to the new position coordinates of the 40 pixel points after the deformation and the plane shape of the lip to form three-dimensional profile information corresponding to the lip. Therefore, the flexible display can learn or let other electronic equipment in communication connection with the flexible display learn the profile information of the lip. Therefore, the application effectively solves the technical problem that the electronic equipment including the flexible display is unable to acquire the profile information of the object, and thus implements the technical effect that the flexible display can acquire and transfer the profile information of the object.

In a specific implementation process, after Step S103 is executed, the method may further include:

detecting and acquiring temperature information of the first object; and sending the at least one piece of deformation information and the temperature information to electronic equipment connected with the flexible display, where the electronic equipment may control, based on the at least one piece of deformation information, a display unit of the electronic equipment having a deformation function to deform, and control an area where the display unit deforms to have a temperature matching with the temperature information, or when the display unit of the electronic equipment does not have the deformation function, the electronic equipment may generate, based on the at least one piece of deformation information, a modeling image and display the modeling image on the display unit.

In a concrete implementation process, use of the foregoing example is continued. Specifically, after the flexible display records the coordinate position of each one of the 56 pixel points in contact with the surface of the cuboid before the deformation and the new position coordinate value of each one of the 56 pixel points after the deformation, the flexible display may also detect the temperature of the cuboid to acquire the current temperature of the cuboid. In practical application, a temperature sensor may be disposed in the flexible display to detect the temperature. Of course, other manners may also be used, which are not limited herein. Specifically, when the flexible display detects and learns that the temperature of the cuboid is 20° C., the flexible display may send the temperature as well as the recorded coordinate position of each one of the 56 pixel points in contact with the surface of the cuboid before the deformation and the new position coordinate value of each one of the 56 pixel points after the deformation to the electronic equipment in communication with the flexible display. The electronic equipment may be another flexible display, or other electronic equipment including the flexible display such as a mobile phone or a tablet computer and so on, or electronic equipment having an ordinary display such as a mobile phone or a computer and so on.

After the electronic equipment in communication with the flexible display receives temperature information of the cuboid sent by the flexible display as well as the recorded coordinate position of each one of the 56 pixel points in contact with the surface of the cuboid before the deformation and the new position coordinate value of each one of the 56 pixel points after the deformation, when the display unit of the electronic equipment has the deformation function, for example, when the electronic equipment is another flexible display, the another flexible display may control the another flexible display to deform and enable the area where the deformation occurs to have a temperature consistent with the temperature of the cuboid. When the display unit of the electronic equipment does not have the deformation function, for example, when the electronic equipment is a mobile phone having an ordinary display, the mobile phone may generate, according to the received coordinate position of each one of the 56 pixel points in contact with the surface of the cuboid before the deformation and the new position coordinate value of each one of the 56 pixel points after the deformation, a three-dimensional modeling image and display the three-dimensional modeling image corresponding to the surface of the cuboid on the display of the mobile phone.

In a concrete implementation process, use of the foregoing example is continued. Specifically, after the flexible display records the coordinate position of each one of the 40 pixel points of the area corresponding to the lip before the deformation and records the new position coordinate of each one of the 40 pixel points after they are pressed by the lip and thus deform, the temperature of the lip may also be detected. Specifically, when the flexible display detects and learns that the temperature of the lip is 36° C., the flexible display may send the temperature as well as the recorded coordinate position of each one of the 40 pixel points in contact with the lip before the deformation and the new position coordinate value of each one of the 40 pixel points after the deformation to the electronic equipment in communication with the flexible display.

Specifically, after the electronic equipment in communication with the flexible display receives the lip temperature information sent by the flexible display as well as the recorded coordinate position of each one of the 40 pixel points in contact with the lip before the deformation and the new position coordinate value of each one of the 40 pixel points after the deformation, when the display unit of the electronic equipment has the deformation function, for example, when the electronic equipment is another flexible display, the another flexible display may control the another flexible display to deform and enable the area where the deformation occurs to have a temperature consistent with the temperature of the lip. When the display unit of the electronic equipment does not have the deformation function, for example, when the electronic equipment is a mobile phone having an ordinary display, the mobile phone may generate, according to the received coordinate position of each one of the 40 pixel points in contact with the lip before the deformation and the new position coordinate value of each one of the 40 pixel points after the deformation, a three-dimensional modeling image and display the three-dimensional modeling image corresponding to the lip on the display of the mobile phone.

Embodiment II

Figure 5:
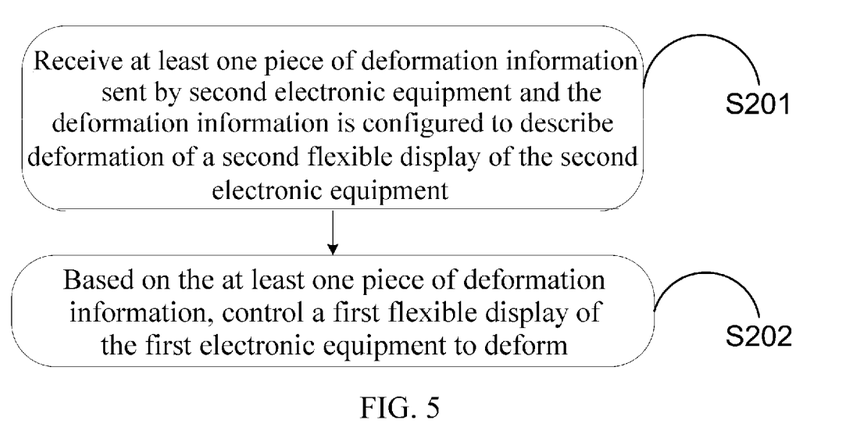
FIG. 5 is an information processing method according to Embodiment II.

Referring to FIG. 5, which shows an information processing method according to Embodiment II of the application, the method is applicable to first electronic equipment and includes:

S201: Receive at least one piece of deformation information sent by second electronic equipment and the deformation information is configured to describe deformation of a second flexible display of the second electronic equipment; and S202: Based on the at least one piece of deformation information, control a first flexible display of the first electronic equipment to deform.

In a concrete implementation process, the first electronic equipment may be electronic equipment provided with the flexible display such as a mobile phone or a computer or the like, or a flexible display that may be separately used or sold. Similarly, the second electronic equipment may also be electronic equipment provided with the flexible display such as a mobile phone or a computer or the like, or flexible display equipment that may be separately used or sold. In this embodiment, the concrete implementation process of a method of the embodiments is described in detail by taking an example in which the first electronic equipment is a mobile phone provided with the flexible display and the second electronic equipment is flexible display equipment that may be separately used or sold.

When the method in this embodiment is used for information processing, first, Step S201 is executed, namely, receiving at least one piece of deformation information sent by a second electronic equipment, and the deformation information is configured to describe deformation of a second flexible display of the second electronic equipment.

In a concrete implementation process, use of the foregoing example is continued. The mobile phone is in communication connection with the flexible display equipment, when the flexible display of the flexible display equipment produces a deformation, the flexible display equipment may send deformation information corresponding to the deformation to the mobile phone, and the mobile phone may receive the deformation information that is sent by the flexible display equipment and is configured to describe deformation of the flexible display of the flexible display equipment. In practical application, the deformation information may include the position coordinates corresponding to the area where the flexible display of the flexible display equipment deforms and the deformation quantity corresponding to the area. Specifically, when the flexible display of the flexible display equipment is divided into 100 points according to pixel, supposing that the area where the flexible display of the flexible display equipment deforms is from the 51st pixel point to the 100th pixel point, the deformation information received by the mobile phone may include the position coordinate of each one from the 51st pixel point to the 100th pixel point before the deformation and generated coordinate variation information of each one from the 51st pixel point to the 100th pixel point after the deformation. The coordinate variation information may be variation quantity, compared with the position coordinates before the deformation, of the position coordinate of each one from the 51st pixel point to the 100th pixel point after the deformation, or the new position coordinate of each one from the 51st pixel point to the 100th pixel point after the deformation.

After Step S201 is executed, according to the method in this embodiment, Step S202 is executed, namely, based on the at least one piece of deformation information, controlling a first flexible display of the first electronic equipment to deform.

In embodiments, Step S202 includes the following three implementations.

Figure 6:
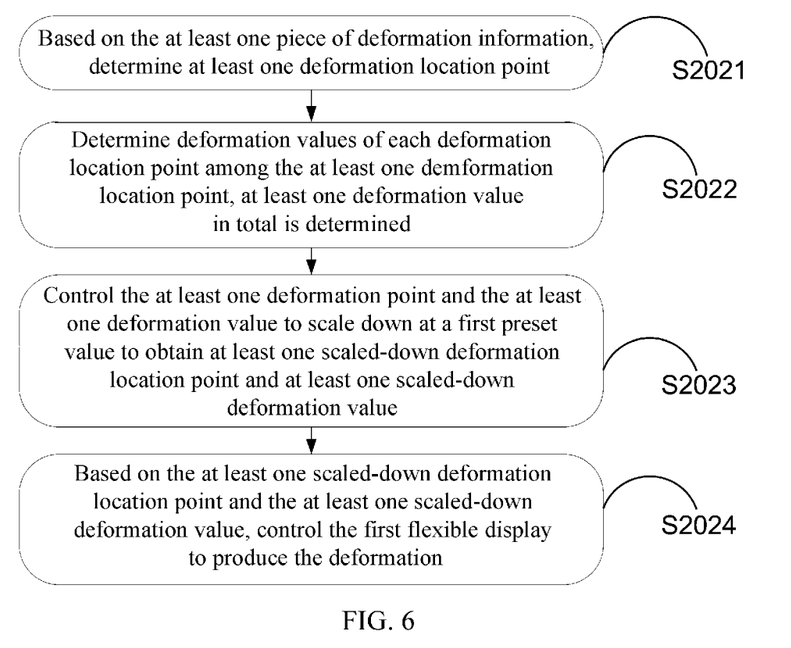
FIG. 6 is a flowchart of a first implementation of Step S202 according to Embodiment II.

Referring to FIG. 6, which shows the first implementation of Step S202, where the first size of the first flexible display is smaller than the second size of the second flexible display, and the first implementation of Step S202 includes:

S2021: Based on the at least one piece of deformation information, determine at least one deformation location point;

S2022: Determine deformation values of each deformation location point among the at least one deformation location point, at least one deformation value in total being determined;

S2023: Control the at least one deformation location point and the at least one deformation value to scale down at a first preset value and obtain at least one scaled-down deformation location point and at least one scaled-down deformation value; and S2024: Based on the at least one scaled-down deformation location point and the at least one scaled-down deformation value, control the first flexible display to produce the deformation.

In a concrete implementation process, use of the foregoing example is continued. When the size of the flexible display of the mobile phone is smaller than that of the flexible display of the flexible display equipment, the mobile phone needs to determine, from the received deformation information, a deformation location point. Specifically, the mobile phone needs to determine, from the received deformation information, the position coordinate of each one from the 51st pixel point to the 100th pixel point before the deformation; the position coordinates corresponding to the foregoing 50 pixel points before the deformation being determined, then the mobile phone determines, from the deformation information, the new position coordinate of each one of the 50 pixel points after the deformation; then, the mobile phone scales down, according to a preset value, the position coordinates corresponding to the 50 pixel points before the deformation and the new position coordinates corresponding to the 50 pixel points after the deformation; and then, the mobile phone may control, according to the scaled-down position coordinates corresponding to the 50 pixel points before the deformation and the scaled-down new position coordinates corresponding to the 50 pixel points after the deformation, the area, on the flexible display of the mobile phone, corresponding to the scaled-down position coordinates corresponding to the 50 pixel points before the deformation to deform, and control the deformation quantity of the area to be consistent with the scaled-down new position coordinates corresponding to the 50 pixel points after the deformation.

Figure 7:
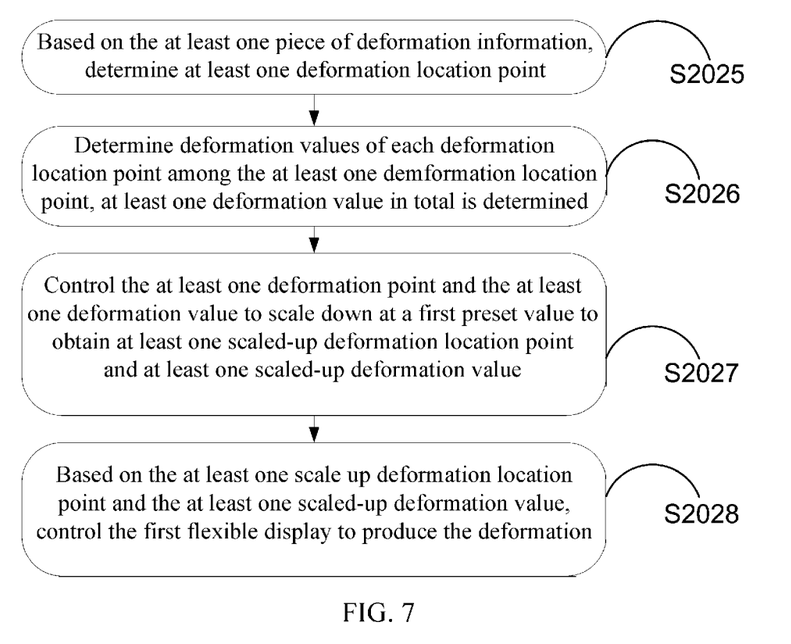
FIG. 7 is a flowchart of a second implementation of Step S202 according to Embodiment II.

Referring to FIG. 7, which shows the second implementation of Step S202, where the first size of the first flexible display is greater than the second size of the second flexible display, and the second implementation of Step S202 includes:

S2025: Based on the at least one piece of deformation information, determine at least one deformation location point;

S2026: Determine deformation values of each deformation location point among the at least one deformation location point, at least one deformation value in total being determined;

S2027: Control the at least one deformation location point and the at least one deformation value to scale up at a second preset value to obtain at least one scaled-up deformation location point and at least one scaled-up deformation value; and S2028: Based on the at least one scaled-up deformation location point and the at least one scaled-up deformation value, control the first flexible display to produce the deformation.

In a concrete implementation process, use of the foregoing example is continued. When the size of the flexible display of the mobile phone is larger than that of the flexible display of the flexible display equipment, the mobile phone needs to determine, from the received deformation information, a deformation location point. Specifically, the mobile phone needs to determine, from the received deformation information, the position coordinate of each one from the 51st pixel point to the 100th pixel point before the deformation; the position coordinates corresponding to the foregoing 50 pixel points before the deformation being determined, then the mobile phone determines, from the deformation information, the new position coordinate of each one of the 50 pixel points after the deformation; then, the mobile phone scales up, according to a preset value, the position coordinates corresponding to the 50 pixel points before the deformation and the new position coordinates corresponding to the 50 pixel points after the deformation; and then, the mobile phone may control, according to the scaled-up position coordinates corresponding to the 50 pixel points before the deformation and the scaled-up new position coordinates corresponding to the 50 pixel points after the deformation, the area, on the flexible display of the mobile phone, corresponding to the scaled-up position coordinates corresponding to the 50 pixel points before the deformation to deform, and control the deformation quantity of the area to be consistent with the scaled-up new position coordinates corresponding to the 50 pixel points after the deformation.

Figure 8:
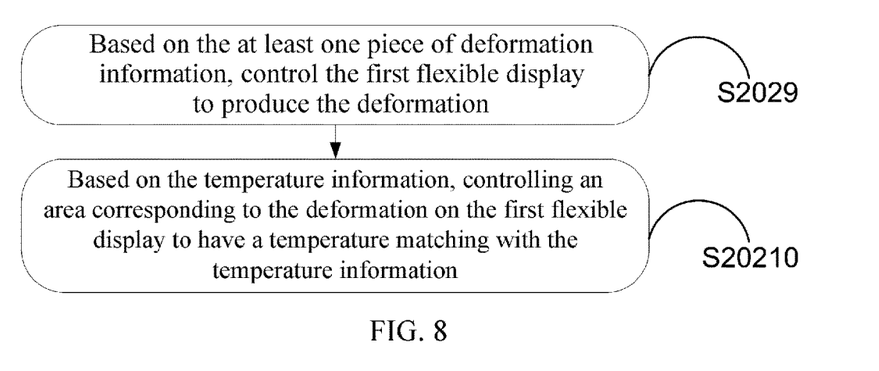
FIG. 8 is a flowchart of a third implementation of Step S202 according to Embodiment.

Referring to FIG. 8, which shows the third implementation of Step S202, where a method of an embodiment further includes: receiving temperature information which is sent by the second electronic equipment and configured to describe deformation of the second flexible display, and the third implementation of Step S202 includes:

S2029: Based on the at least one piece of deformation information, control the first flexible display to produce the deformation; and S20210: Based on the temperature information, control an area corresponding to the deformation on the first flexible display to have a temperature matching with the temperature information.

In a concrete implementation process, use of the foregoing example is continued. Specifically, in addition to deformation information on the deformation of the flexible display of the flexible display equipment, which is sent by the flexible display equipment, the mobile phone also receives temperature information of the area where the flexible display of the flexible display equipment produces a deformation. When the size of the flexible display of the mobile phone is larger than or smaller than that of the flexible display of the flexible display equipment, the mobile phone may control, according to the received deformation information and the first implementation or the second implementation of Step S202, the flexible display of the mobile phone to deform, after which, the mobile phone may control again, according to the received temperature information, the area on the flexible display of the mobile phone where the deformation occurs, to have a temperature corresponding to the temperature information. Of course, in practical application, when the size of the flexible display of the mobile phone is consistent with that of the flexible display of the flexible display equipment, the mobile phone may control, according to the received deformation information, a position on the flexible display of the mobile phone which is corresponding to a position point found from the deformation information, where the flexible display of the flexible display equipment deforms, to generate deformation corresponding to the deformation quantity of the position point where the flexible display of the flexible display equipment produces a deformation.

Embodiment III

Figure 9:
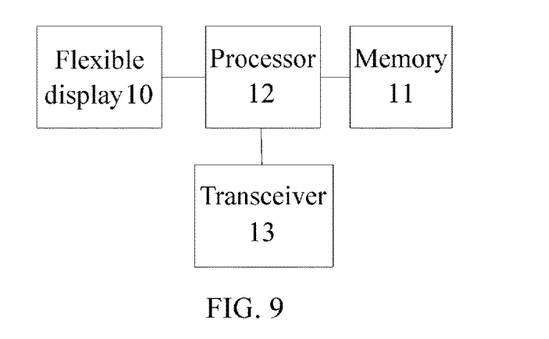
FIG. 9 is a schematic structural diagram of a flexible display device according to Embodiment.

Referring to FIG. 9, based on an inventive concept the same as Embodiment I of the application, Embodiment III of the application provides a flexible display device, including:
a flexible display 10;
a memory 11;
a processor 12 connected with the flexible display 10 and the memory 11;
the processor 12 being configured to: acquire a first operation performed on the flexible display 10;
respond to the first operation to control the flexible display 10 to deform, wherein in the process when the flexible display 10 produces a deformation, at least a part area of the flexible display 10 comes in contact with at least a part surface of a first object; and
record at least one piece of deformation information of the at least part area in the memory 11.

In a concrete implementation process, the flexible display 10 of the foregoing flexible display device has a deformation function. For example, the flexible display 10 may sink down when it is pressed by an object. Under the control of a processor in the flexible display device, the flexible display 10 may also sink down or bulge upward. In practical application, no matter whether the flexible display 10 of the flexible display device produces a deformation because it is pressed by an object or the flexible display 10 produces a deformation because it is controlled by the processor 12, the flexible display device 10 may record the deformation in a memory 11.

In practical application, the flexible display 10 having a deformation function of the flexible display device may be implemented by means of the following design. Specifically, refer to FIG. 10, which shows the first design manner of the flexible display 10.

Figure 10:
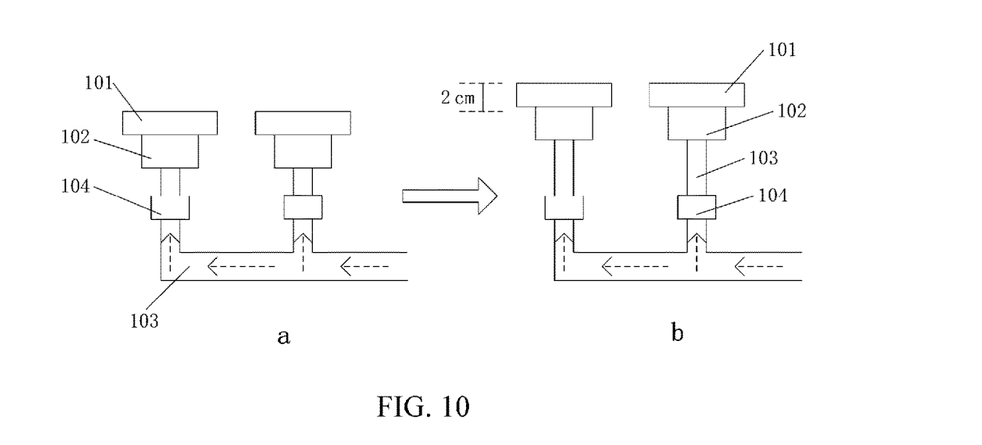
FIG. 10 is a schematic structural diagram of a first design of a flexible display according to Embodiment III.

The flexible display 10 at least includes a flexible display main body 101, a drive unit 102, a channel 103, and a control valve 104, where the drive unit 102 is disposed beneath the flexible display main body 101, the channel 103 is communicated with the drive unit 102, the channel 103 is provided with the control valve 104, the control valve 104 is configured to control gas to flow into/out of the drive unit 102 through the channel 103 and control the gas flow. When the control valve 104 in the flexible display 10 is opened so that the gas flows into the drive unit 102 through the channel 103 at a certain flow rate, the gas may drive the drive unit 102 up. Because the drive unit 102 is disposed beneath the flexible display main body 101, the flexible display main body 101 is also rushed up when the drive unit 102 is driven up, thereby changing the position of the flexible display main body 101. In practical application, the flexible display main body 101 may be divided into multiple units according to pixel, as shown in FIG. 10a or FIG. 10b, beneath each unit there is provided with a drive unit, a channel and a control valve, so that each unit may be controlled to move up or down by controlling the gas to flow into/out of the drive unit, and the moving distance thereof may be controlled by controlling the gas flow.

Specifically, please continue referring to FIG. 10a, when the control valve 104 in the flexible display 10 is opened so that the gas flows into the drive unit 102 through the channel 103 at a certain flow rate (in FIG. 10a, the dotted arrow indicates the gas flow direction). In practical application, the drive unit 102 may be a vertical column or a press key that can move up or down under gas inflation or deflation. An example is taken herein in which the drive unit 102 is a vertical column, the vertical column is inflated after the gas flows into the vertical column through the channel 103 at a certain flow rate, and the vertical column is rushed up just as shown in FIG. 10b, driven by which the flexible display main body 101 is also rushed up, thereby changing the position of the flexible display main body 101, in FIG. 10b, supposing that the flexible display main body 101 and the vertical column move up by 2 cm. In practical application, the moving distance may be controlled by changing the gas flow, which is not discussed in detail herein.

Figure 11:
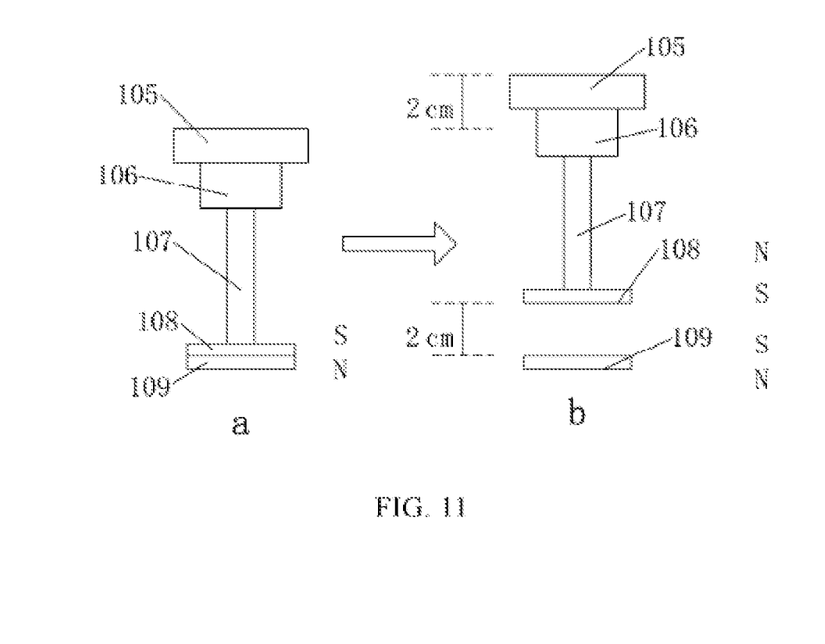
FIG. 11 is a schematic structural diagram of a second design of the flexible display according to Embodiment.

Please refer to FIG. 11, which shows a second design manner of the flexible display 10:

The flexible display 10 at least includes a flexible display main body 105, a drive unit 106, a permanent magnet 109 and an electromagnet 108, where the drive unit 106 is disposed beneath the flexible display main body 105, the drive unit 106 is connected to the electromagnet 108 by means of a connection structure 107, and the permanent magnet 109 is disposed beneath the electromagnet 108. The direction of a magnetic pole in the electromagnet 108 is changed by adjusting the direction of current of the electromagnet 108, so that the electromagnet 108 and the permanent magnet 109 repel or attract each other, which drives the drive unit 106 to move up or down. Because the drive unit 106 is disposed beneath the flexible display main body 105, when the drive unit 106 moves up or down, the flexible display main body 105 also moves up or down. Of course, the person skilled in the art may understand that the moving-up or moving-down distance of the flexible display main body 105 may be set up by changing the current magnitude of the electromagnet 108, which is not discussed in detail herein.

In practical application, the flexible display main body 105 may be divided into multiple units according to pixel, as shown in FIG. 11a or FIG. 11b, beneath each unit there is provided with a drive unit 106, a permanent magnet 109 and an electromagnet 108. Specifically, please continue referring to FIG. 11a, in which it is assumed that the south pole (S) of the permanent magnet 109 is positioned above the north pole (N) thereof, an up-direction current being applied to the electromagnet, according to Ampere's rule, in a magnetic field formed by the galvanized electromagnet, N is certainly positioned above S (as shown in FIG. 11b), so that S of the permanent magnet 109 and S of the electromagnet 108 repel each other, which drives the electromagnet 108 as well as the drive unit 106 and the flexible display main body 105 above the electromagnet 108 to move up as a whole, in FIG. 11b, supposing that the moving-up distance is 2 cm.

Of course, in practical application, the flexible display 10 also may be implemented by means of other similar design manners in addition to the foregoing two design manners, not to be enumerated herein.

Alternatively, the processor 12 is specifically configured to: detect and acquire a wrapping operation configured to wrap the first object in the flexible display 10.

Alternatively, the processor 12 is specifically configured to: detect and acquire a pressing operation performed by an operation body on the flexible display 10, where the operation body is the first object.

Alternatively, the memory 11 is specifically configured to: record at least one deformation location point of the at least part area; and record deformation values of each deformation location point among the at least one deformation location point, there being at least one deformation value in total.

Alternatively, the processor 12 is further configured to: based on the at least one deformation location point, determine plane shape information of the at least part surface of the first object; and based on the at least one deformation value and the plane shape information, determine three-dimensional profile information of at least a part of the first object corresponding to the at least part surface.

Alternatively, the flexible display device further includes a transceiver 13, connected with the processor 12 and the transceiver 13 is specifically configured to: after the processor 12 detects and acquires temperature information of the first object, send the at least one piece of deformation information and the temperature information to electronic equipment connected with the flexible display device 10, where the electronic equipment may control, based on the at least one piece of deformation information, a display unit of the electronic equipment having a deformation function to deform, and control an area where the display unit deforms to have a temperature matching with the temperature information, or when the display unit of the electronic equipment does not have the deformation function, the electronic equipment may generate, based on the at least one piece of deformation information, a modeling image and display the modeling image on the display unit.

Embodiment IV

Figure 12:
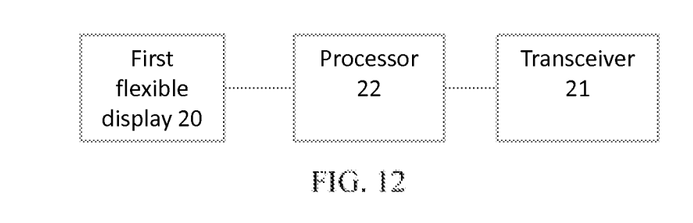
FIG. 12 is a schematic structural diagram of electronic equipment according to Embodiment IV.

Referring to FIG. 12, based on an inventive concept the same as Embodiment II of the application, Embodiment IV of the application provides electronic equipment, including:

a first flexible display 20;

a transceiver 21;

a processor 22 connected with the transceiver 21 and the first flexible display 20;

the transceiver 21 being configured to receive at least one piece of deformation information sent by second electronic equipment and the deformation information is configured to describe deformation of a second flexible display of the second electronic equipment; and the processor 22 being configured to control, based on the at least one piece of deformation information, the first flexible display 20 of the electronic equipment to deform.

Alternatively, the first size of the first flexible display 20 is smaller than the second size of the second flexible display, and the processor 22 is specifically configured to:

based on the at least one piece of deformation information, determine at least one deformation location point;

determine deformation values of each deformation location point among the at least one deformation location point, at least one deformation value in total being determined;

control the at least one deformation location point and the at least one deformation value to scale down at a first preset value and obtain at least one scaled-down deformation location point and at least one scaled-down deformation value; and based on the at least one scaled-down deformation location point and the at least one scaled-down deformation value, control the first flexible display 20 to produce the deformation.

Alternatively, the first size of the first flexible display 20 is greater than the second size of the second flexible display, and the processor 22 is specifically configured to:

based on the at least one piece of deformation information, determine at least one deformation location point;

determine deformation values of each deformation location point among the at least one deformation location point, at least one deformation value in total being determined;

control the at least one deformation location point and the at least one deformation value to scale up at a second preset value to obtain at least one scaled-up deformation location point and at least one scaled-up deformation value; and based on the at least one scaled-up deformation location point and the at least one scaled-up deformation value, control the first flexible display 20 to produce the deformation.

Alternatively, the transceiver 21 is further configured to: receive temperature information sent by the second electronic equipment and the temperature information is configured to describe information related to the deformation of the second flexible display, and the processor 22 is further configured to: based on the at least one piece of deformation information, control the first flexible display 20 to produce the deformation; and based on the temperature information, control an area corresponding to the deformation on the first flexible display 20 to have a temperature matching with the temperature information.

The foregoing one or more technical solutions of embodiments have at least the following one or more technical effects:

1. The technical solutions of embodiments adopt such a technical solution as below: acquiring a first operation performed on a flexible display; responding to the first operation, the flexible display deforming, wherein in the process when the flexible display produces a deformation, at least a part area of the flexible display comes in contact with at least a part surface of a first object; and recording at least one piece of deformation information of the at least part area. Namely, in the application, an operation is performed on the flexible display by means of an object so that when the flexible display produces a deformation, the flexible display can record deformation information sent by the flexible display. Therefore, the application effectively solves the technical problem that, in the prior art, the flexible display is unable to record the deformation information, and thus implements the technical effect that the flexible display can record deformation.

2. The technical solutions of embodiments adopt such a technical solution as below: based on the at least one deformation location point, determining plane shape information of the at least part surface of the first object; and based on the at least one deformation value and the plane shape information, determining three-dimensional profile information of at least a part of the first object corresponding to the at least part surface. Namely, in the application, when an operation is performed on the flexible display by means of an object, the surface of the object in contact with the flexible display is corresponding to an area where the flexible display produces a deformation, the plane shape of the object may be known from the deformation information recorded by the flexible display, then the three-dimensional profile information of the surface of the object in contact with the flexible display may be determined by means of deformation quantity of each specific point in the plane shape, and then the flexible display or other electronic equipment in communication connection with the flexible display may acquire the profile information of the object. Therefore, the application effectively solves the technical problem that the electronic equipment including the flexible display is unable to acquire the profile information of the object, and thus implements the technical effect that the flexible display can acquire and transfer the profile information of the object.

3. The technical solutions of embodiments adopt such a technical solution as below: detecting and acquiring temperature information of the first object; and sending the at least one piece of deformation information and the temperature information to the electronic equipment connected with the flexible display, where the electronic equipment can control, based on the at least one piece of deformation information, a display unit of the electronic equipment having a deformation function to deform and control an area where the display unit deforms to have a temperature matching with the temperature information, or when the display unit of the electronic equipment does not have the deformation function, the electronic equipment can generate, based on the at least one piece of deformation information, a modeling image and display the modeling image on the display unit. Namely, in the application, the temperature information of the object may be detected and acquired, when the temperature information and the deformation information are sent to the electronic equipment having a deformation function and connected with the flexible display, the electronic equipment can control, based on the received information, a corresponding area to deform, and control the deformation area to have a temperature matching with the received temperature information. Therefore, the application has a beneficial effect in really and completely reproducing and transferring the information of the object, and has a beneficial effect in improving the user experience.

Those skilled in the art should realize that embodiments may be provided as a method, a system or a computer program product. Therefore, the present invention may use forms of a full hardware embodiment, a full software embodiment, or an embodiment in combination of software and hardware aspects. Furthermore, the present invention may use forms of computer program products implemented on one or more computer storage media (including but not limited to a magnetic disk memory, a CD-ROM, an optical memory or the like) which includes a computer program code. In the context of this document, a storage device is not a signal and "non-transitory" includes all media except signal media.

The present invention is described with reference to flowcharts and/or block diagrams of the method in the embodiments of the present invention, equipment (system) and a computer program product. It should be understood that each flow and/or block in the flowcharts and/or block diagrams and a combination thereof may be implemented by means of computer program instructions. These computer program instructions may be provided for a general-purpose computer, a special-purpose computer, an embedded processor or processors of other programmable data processing terminal equipment to generate a machine, so as to generate an apparatus configured to implement designated functions in one or more flows of a flowchart and/or one or more blocks of a block diagram by means of instructions executed by a computer or a processor of other programmable data processing equipment.

These computer program instructions may also be stored in a computer-readable memory that can guide a computer or other programmable data processing equipment to work in a particular way, so that the instructions stored in the computer-readable memory generate a manufactured product including a command device that implements the designated functions in one or more flows of a flowchart and/or one or more blocks of a block diagram.

These computer program instructions may also be loaded on a computer or other programmable data processing equipment, to execute a series of operating steps on the computer or other programmable equipment to generate treatments implemented by the computer, so that instructions executed on the computer or other programmable equipment provide steps configured to implement designated functions in one or more flows of a flowchart and/or one or more blocks of a block diagram.

Specifically, computer program instructions corresponding to the information processing method in the embodiments of the application may be stored in a storage medium such as a compact disk, a hard disk or a U disk and so on. When the computer program instructions corresponding to the information processing method in the storage medium are read or executed by electronic equipment, the following steps are included:

acquiring a first operation performed on a flexible display;

responding to the first operation, the flexible display deforming, wherein in the process when the flexible display produces a deformation, at least a part area of the flexible display comes in contact with at least a part surface of a first object; and recording at least one piece of deformation information of the at least part area.

Alternatively, when the computer program instructions (stored in the storage medium) corresponding to the step of acquiring a first operation performed on the flexible display are executed, they specifically include:

detecting and acquiring a wrapping operation configured to wrap the first object in the flexible display.

Alternatively, when the computer program instructions (stored in the storage medium) corresponding to the step of acquiring a first operation performed on the flexible display are executed, they specifically include:

detecting and acquiring a pressing operation performed by an operation body on the flexible display, where the operation body is the first object.

Alternatively, when the computer program instructions (stored in the storage medium) corresponding to the step of recording at least one piece of deformation information of the at least part area are executed, they specifically include:

recording at least one deformation point of the at least part area; and recording deformation values of each deformation location point among the at least one deformation location point, there being at least one deformation value in total.

Alternatively, the storage medium also stores some other computer program instructions, which are executed after the step of recording the at least one piece of deformation information of the at least part area, which include the following steps in execution:

based on the at least one deformation location point, determining plane shape information of the at least part surface of the first object; and based on the at least one deformation value and the plane shape information, determining three-dimensional profile information of at least a part of the first object corresponding to the at least part surface.

Alternatively, the storage medium also stores some other computer program instructions, which are executed after the step of recording the at least one piece of deformation information of the at least part area, which include the following steps in execution:

detecting and acquiring temperature information of the first object; and sending the at least one piece of deformation information and the temperature information to electronic equipment connected with the flexible display, where the electronic equipment may control, based on the at least one piece of deformation information, a display unit of the electronic equipment having a deformation function to deform, and control an area where the display unit deforms to have a temperature matching with the temperature information, or when the display unit of the electronic equipment does not have the deformation function, the electronic equipment may generate, based on the at least one piece of deformation information, a modeling image and display the modeling image on the display unit.

Those skilled in the art can make various modifications and variations on the embodiments without departing from the spirit and scope of the present invention. In this way, if the modifications and variations of the disclosure invention fall within the scope of the claims of the present invention and equivalent technologies thereof, the disclosure also intends to include the modifications and variations.

What is claimed is:

1. A method, comprising:
   detecting a deformation of a first flexible display of a first electronic device, wherein the deformation of the first flexible display is a result of object contact with the first flexible display;
   obtaining deformation information relating to said deformation; and
   transmitting the obtained deformation information to a second electronic device comprising a second flexible display, to control corresponding deformation of the second flexible display based on the transmitted deformation information.

2. The method of claim 1, wherein the detecting the deformation comprises:
   detecting and acquiring a wrapping operation configured to wrap a first object in the first flexible display.

3. The method of claim 1, wherein the detecting the deformation comprises:
   detecting and acquiring a pressing operation performed by an operation body on the first flexible display, wherein the operation body is a first object.

4. The method of claim 2, wherein the obtaining deformation information comprises:
   recording at least one deformation location point of a at least part area; and
   recording deformation values of each deformation location point among the at least one deformation location point, there being at least one deformation value in total.

5. The method of claim 4, wherein after the recording of at least one piece of deformation information of the at least part area, the method further comprises:
   based on the at least one deformation location point, determining plane shape information of the at least part surface of the first object; and
   based on the at least one deformation value and the plane shape information, determining three-dimensional profile information of at least a part of the first object corresponding to the at least part surface.

6. The method of claim 2, wherein after the obtaining deformation information, the method further comprises:
   detecting and acquiring temperature information of the first object; and
   sending at least one piece of deformation information and temperature information to electronic equipment operatively connected to a flexible display, wherein the electronic equipment controls, based on the at least one piece of deformation information, a display unit of the electronic equipment having a deformation function to deform, and control an area where the display unit deforms to have a temperature matching with the temperature information; or when the display unit of the electronic equipment does not have the deformation function, the electronic equipment generates, based on the at least one piece of deformation information, a modeling image and displays the modeling image on the display unit.

7. The method of claim 3, wherein the obtaining deformation information comprises:
   recording at least one deformation location point of a at least part area.

8. The method of claim 7, wherein the obtaining deformation information further comprises recording deformation values of each deformation location point among the at least one deformation location point, there being at least one deformation value in total.

9. An electronic device, comprising:
   a processor;
   a first flexible display operatively coupled to the processor;
   a transceiver operatively coupled to the processor; and
   a memory device that stores instructions executable by the processor to:
   detect a deformation of the first flexible display, wherein the deformation of the first flexible display is a result of object contact with the first flexible display;
   obtain deformation information relating to said deformation; and
   instruct the transceiver to transmit the deformation information to another electronic device having a second flexible display to control corresponding deformation of the second flexible display based on the transmitted deformation information.

10. The electronic device of claim 9, wherein the instructions are further executable to:
    detect and acquire a wrapping operation configured to wrap a first object in the flexible display.

11. The electronic device of claim 10, wherein the instructions are further executable to:

detect and acquire a pressing operation performed by an operation body on the first flexible display, wherein the operation body is a first object.

12. The electronic device of claim 10, wherein the instructions are further executable to:
record at least one deformation location point of an at least part area; and
record deformation values of each deformation location point among the at least one deformation location point, there being at least one deformation value in total.

13. The electronic device of claim 12, wherein the instructions are further executable to:
based on the at least one deformation location point, determine plane shape information of the at least part surface of the first object; and
based on the at least one deformation value and the plane shape information, determine three-dimensional profile information of at least a part of the first object corresponding to the at least part surface.

14. The electronic device of claim 10, wherein the first flexible display device further comprises a transceiver, operatively connected to the processor, and the transceiver is specifically configured to:
after the processor detects and acquires temperature information of the first object, send the at least one piece of deformation information and the temperature information to electronic equipment connected with the flexible display device, wherein the electronic equipment controls, based on the at least one piece of deformation information, a second display unit of the electronic equipment having a deformation function to produce a deformation, and control an area where the second display unit produces a deformation to have a temperature matching with the temperature information; or when the display unit of the electronic equipment does not have the deformation function, the electronic equipment generates, based on the at least one piece of deformation information, a modeling image and display the modeling image on the display unit.

15. The electronic device of claim 11, wherein the first flexible display device further comprises a transceiver, operatively connected to the processor.

16. The electronic device of claim 15, wherein the transceiver is specifically configured to:
after the processor detects and acquires temperature information of the first object, send the at least one piece of deformation information and the temperature information to electronic equipment connected with the flexible display device, wherein the electronic equipment controls, based on the at least one piece of deformation information, a second display unit of the electronic equipment having a deformation function to produce a deformation, and control an area where the second display unit produces a deformation to have a temperature matching with the temperature information; or when the display unit of the electronic equipment does not have the deformation function, the electronic equipment generates, based on the at least one piece of deformation information, a modeling image and display the modeling image on the display unit.

17. An electronic device, comprising:
a processor;
a second flexible display coupled to the processor;
a transceiver coupled to the processor, and
a memory device that stores instructions executable by the processor to:
obtain deformation information received by the transceiver from another electronic device having a first flexible display, said deformation information being a deformation of the first flexible display resulting from object contact with the first flexible display, and
control corresponding deformation of the second flexible display based upon the received deformation information.

18. The electronic device of claim 17, wherein:
a first size of the first flexible display is smaller than a second size of the second flexible display; and
the instructions are further executable to:
based on the at least one piece of deformation information, determine at least one deformation position point;
determine deformation values of each deformation location point among the at least one deformation location point, and at least one deformation value in total being determined;
control the at least one deformation location point and the at least one deformation value to scale down at a first preset value and obtain at least one scaled-down deformation location point and at least one scaled-down deformation value; and
based on the at least one scaled-down deformation location point and the at least one scaled-down deformation value, control the first flexible display to produce the deformation.

19. The electronic device of claim 17, wherein:
a first size of the first flexible display is greater than a second size of the second flexible display; and
the instructions are further executable to:
based on the at least one piece of deformation information, determine at least one deformation position point;
determine deformation values of each deformation position point among the at least one deformation position point, and at least one deformation value in total being determined;
control the at least one deformation position point and the at least one deformation value to scale up at a second preset value and obtain at least one scaled-up deformation position point and at least one scaled-up deformation value; and
based on the at least one scaled-up deformation position point and the at least one scaled-up deformation value, control the first flexible display to produce the deformation.

20. The electronic device of claim 17, wherein:
the transceiver receives temperature information sent by the second electronic equipment, wherein the temperature information comprises information related to the deformation of the second flexible display; and
the instructions are further executable to:
based on the at least one piece of deformation information, control the first flexible display to produce the deformation; and
based on the temperature information, control an area corresponding to the deformation on the first flexible display to have a temperature matching with the temperature information.

* * * * *